(12) United States Patent
Kurashige et al.

(10) Patent No.: US 8,009,378 B2
(45) Date of Patent: Aug. 30, 2011

(54) STORAGE DEVICE AND INFORMATION PROCESSING APPARATUS

(75) Inventors: Takehiko Kurashige, Ome (JP); Shinji Saito, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 105 days.

(21) Appl. No.: 12/604,226

(22) Filed: Oct. 22, 2009

(65) Prior Publication Data

US 2010/0195463 A1    Aug. 5, 2010

(30) Foreign Application Priority Data

Jan. 30, 2009    (JP) .................................. 2009-020692

(51) Int. Cl.
*G11B 15/48* (2006.01)
(52) U.S. Cl. ........................ 360/55; 360/73.01; 360/74.1
(58) Field of Classification Search .................. 360/74.1, 360/73.01

See application file for complete search history.

(56) References Cited

U.S. PATENT DOCUMENTS

| | | | | |
|---|---|---|---|---|
| 5,493,670 A | * | 2/1996 | Douglis et al. ................ | 713/324 |
| 5,504,907 A | * | 4/1996 | Stewart et al. ................ | 713/324 |
| 2006/0274622 A1 | * | 12/2006 | De Boer ..................... | 369/53.43 |

FOREIGN PATENT DOCUMENTS

| | | |
|---|---|---|
| JP | 06-267175 | 9/1994 |
| JP | 11-306664 | 11/1999 |
| JP | 2000-100054 | 4/2000 |

* cited by examiner

*Primary Examiner* — Wayne R Young
*Assistant Examiner* — Brenda Bernardi
(74) *Attorney, Agent, or Firm* — Blakely, Sokoloff, Taylor & Zafman LLP (57) ABSTRACT

According to one embodiment, a power management module of a storage device executes a process of stopping rotation of a disk storage medium by selectively using one of a first mode of stopping the rotation of the disk storage medium on condition that a media access command is not received during a predetermined time from last reception of a media access command, and a second mode of stopping the rotation of the disk storage medium on condition that a media access command which causes access to the disk storage medium is not received during a predetermined time from last reception of a media access command which causes access to the disk storage medium. In addition, the power management module executes a process of starting the rotation of the disk storage medium by selectively using one of a third mode and a fourth mode.

9 Claims, 8 Drawing Sheets

| Starting point of standby timer | Last media access (A0 mode) | Last hard disk access (A1 mode) |
|---|---|---|
| Trigger of spin-up | Media access command (B0 mode) | Hard disk access command (B1 mode) |

STORAGE DEVICE AND INFORMATION
PROCESSING APPARATUS

CROSS-REFERENCE TO RELATED
APPLICATIONS

This application is based upon and claims the benefit of priority from Japanese Patent Application No. 2009-020692, filed Jan. 30, 2009, the entire contents of which are incorporated herein by reference.

BACKGROUND

1. Field

One embodiment of the invention relates to a storage device including a cache, and an information processing apparatus including the storage device.

2. Description of the Related Art

In recent years, various types of personal computers, such as notebook type personal computers and desktop type personal computers, have widely been used. Most of personal computers include hard disk drives (HDDs) as external storage devices.

In addition, recently, in order to improve the responsivity of the HDD, various proposals have been made of so-called hybrid HDDs in which nonvolatile memories functioning as caches are incorporated.

Jpn. Pat. Appln. KOKAI Publication No. H11-306664, for instance, discloses a technique for reducing the power consumption of a storage device such as an HDD. In an external storage device which is disclosed in KOKAI No. H11-306664, the spindle motor is turned off when access to the external storage device from a host device is absent for a predetermined time.

By turning off the spindle motor, the power consumption of the external storage device can be reduced. However, in a case where an access request is issued from the host device in the state in which the spindle motor is turned off, the access to a disk storage medium has to stand by until the spindle motor is turned on and the disk storage medium begins to rotate at a normal rotational speed. Thus, frequent turn-off of the spindle motor may become a factor which deteriorates the responsivity of the external storage medium.

Therefore, it is necessary to realize a novel function which can satisfy demands of both a user who places priority on the responsivity by the sacrifice of the power consumption, and a user who places priority on the power consumption by the sacrifice of the responsivity.

BRIEF DESCRIPTION OF THE SEVERAL
VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a storage device comprising: a disk storage medium; a cache memory configured to store data read from the disk storage medium; a cache control module configured to determine whether data, which is designated by a media access command from a host device, is stored in the cache memory, and to selectively access one of the cache memory and the disk storage medium in accordance with a result of the determination; and a power management module configured to have a first mode of stopping rotation of the disk storage medium on condition that a media access command is not received during a predetermined time from last reception of a media access command, and a second mode of stopping the rotation of the disk storage medium on condition that a media access command which causes access to the disk storage medium is not received during a predetermined time from last reception of a media access command which causes access to the disk storage medium, to execute a process of stopping the rotation of the disk storage medium by using one of the first mode and the second mode, which is selected in accordance with a request from the host device, to have a third mode of starting the rotation of the disk storage medium on condition that a media access command is received in a state in which the rotation of the disk storage medium is stopped, and a fourth mode of starting the rotation of the disk storage medium on condition that a media access command which causes access to the disk storage medium is received in a state in which the rotation of the disk storage medium is stopped, and to execute a process of starting the rotation of the disk storage medium by using one of the third mode and the fourth mode, which is selected in accordance with a request from the host device.

Figure 1:
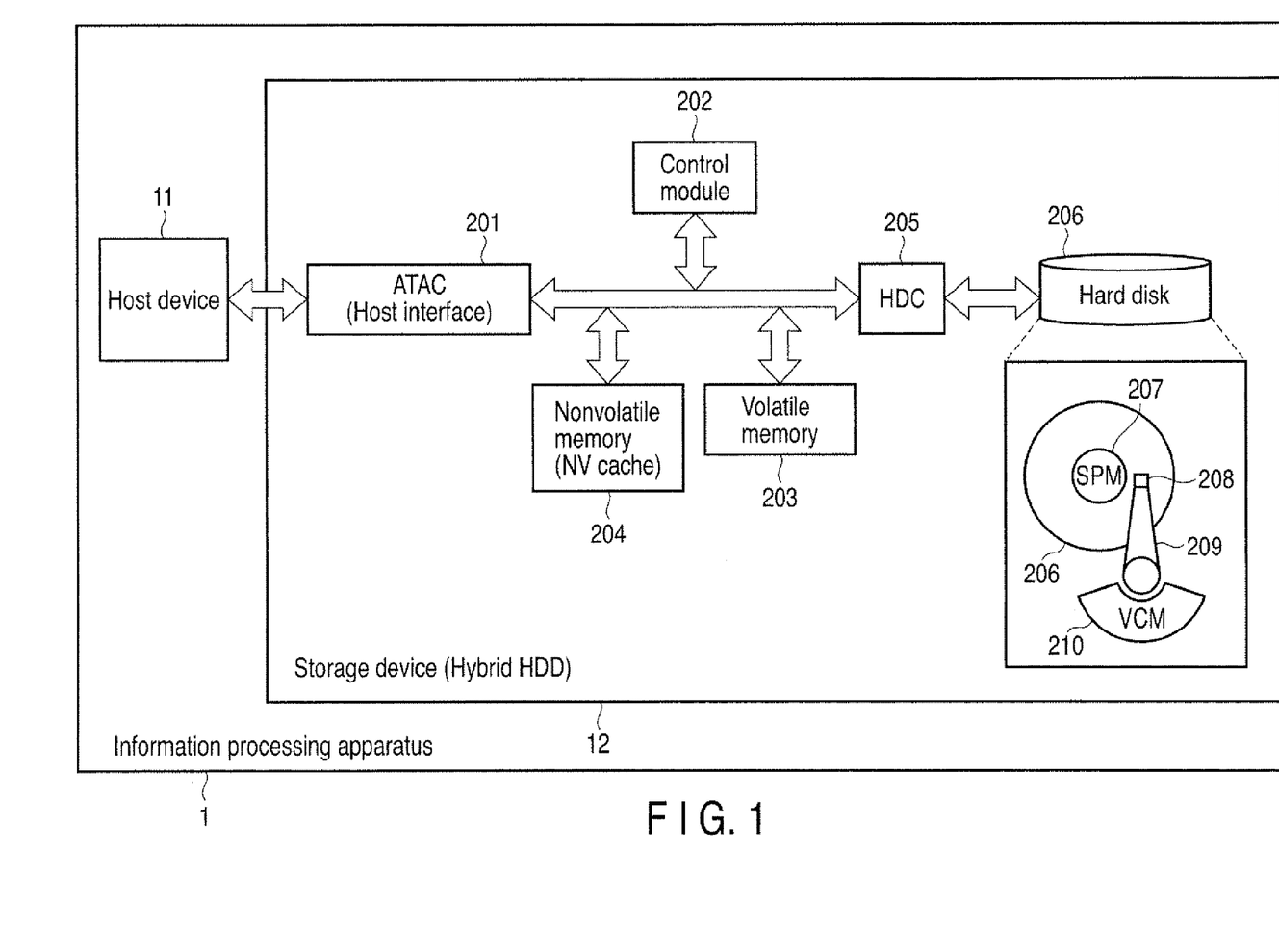
FIG. 1 is an exemplary block diagram showing the structure of an information processing apparatus according to an embodiment of the present invention.

To begin with, referring to FIG. 1, a structure example of a storage device according to an embodiment of the invention is described. This storage device is realized as a storage device 12 which supports, e.g. an ATA standard. The storage device 12 functions, for example, as a hybrid hard disk drive (hybrid HDD). The hybrid HDD is a disk drive including a hard disk (disk storage medium) and a nonvolatile memory functioning as a cache of this disk storage medium.

The storage device 12 is a drive device functioning as an external storage device of an information processing apparatus 1 such as a server or a personal computer. A host device 11 and the storage device 12 are provided in an information processing apparatus main body of the information processing apparatus 1. The host device 11 is a core unit of the information processing apparatus 1, and is composed of a CPU which executes various programs, a memory, etc. The storage device 12 is connected to the host device 11 via an ATA interface such as a serial ATA interface.

The storage device 12 includes an ATA controller (ATAC: AT Attachment Controller) 201, a control module 202, a volatile memory 203, a nonvolatile memory (NV cache) 204, a hard disk controller (HDC) 205, and a hard disk 206. The control module 202 is a microprocessor which controls the respective components in the storage device 12. The ATAC 201 is a host interface which executes communication with the host device 11 via the ATA interface. The HDC 205 is a controller which controls the hard disk 206.

The nonvolatile memory 204 is composed of, e.g. a NAND flash memory. The volatile memory 203 is composed of, e.g. a DRAM.

The hard disk 206 is a disk storage medium. Specifically, the hard disk 206 includes a disk storage medium 206, a spindle motor (SPM) 207, a head 208, an actuator 209, and a voice coil motor (VCM) 210. The SPM 207 rotates the disk storage medium 206. The actuator 209 and the VCM 210 are a head driving mechanism which moves the head 208 in the radial direction of the disk storage medium 206.

The volatile memory 203 functions as a data buffer for temporarily storing write data from the host device 11 or read data which is to be read out to the host device 11. The nonvolatile memory 204 is a cache memory (nonvolatile cache memory) which functions as a cache of the hard disk (disk storage medium) 206. The nonvolatile memory 204 stores data which is read from the hard disk 206. In addition, the nonvolatile memory 204 can constantly store a set of specific data which is to be transferred to the host device 11 at high speed. Specifically, in usual cases, all software (the kernel of an operating system, a device driver, an application program, etc.) and user data are stored in only the hard disk 206. However, in the present embodiment, a copy of a part of such software or a copy of a part of user data stored in the hard disk 206 can constantly be stored in the nonvolatile memory 204 as data which is to be read to the host device 11 at high speed. The data that is constantly stored in the nonvolatile memory 204 is, in some cases, called "pinned data".

The host device 11 can designate which of the data in the hard disk 206 is to be stored in the nonvolatile memory 204. The control module 202 loads data, which corresponds to each logical block address (LBA) designated by the host device 11, from the hard disk 206 into the nonvolatile memory 204. The loaded data can constantly be stored in the nonvolatile memory 204 as pinned data. Besides, data, which is read from the hard disk 206 in accordance with each read command that is issued from the host device 11 during a predetermined time period, for example, from the start to the completion of boot-up of the operating system, may be stored in the nonvolatile memory 204 as pinned data.

The data read-out speed of the nonvolatile memory 204 is higher than that of the hard disk 206. Therefore, by causing the nonvolatile memory 204 to function as the cache of the hard disk 206, the responsivity of the storage device 12 can be enhanced.

Figure 2:
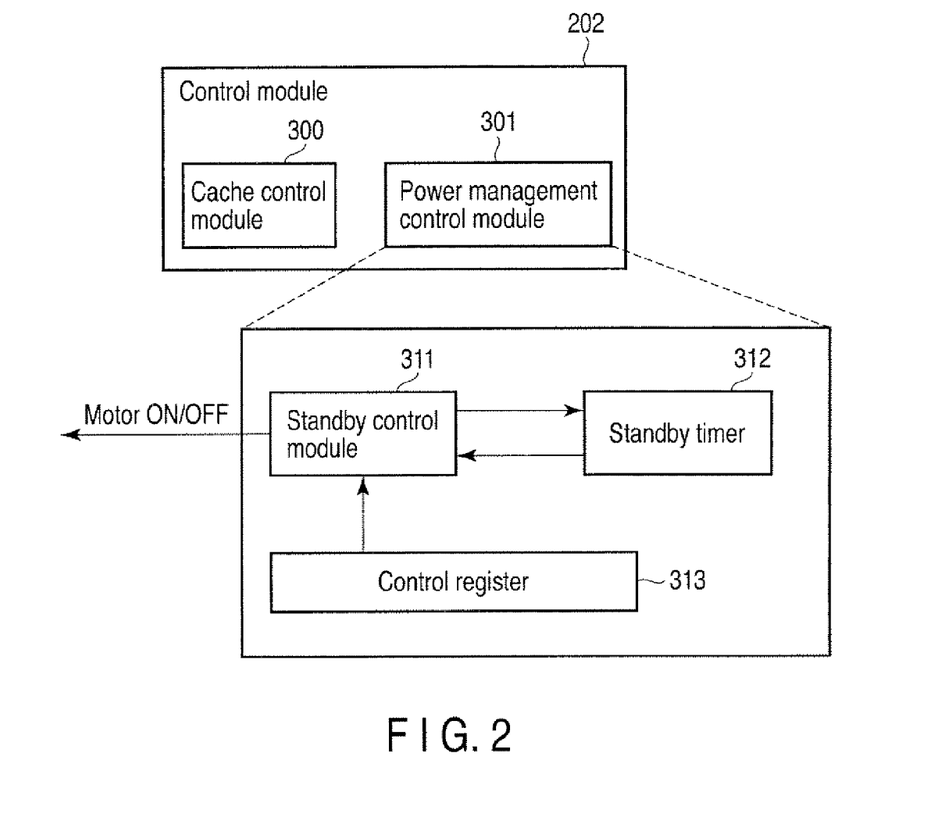
FIG. 2 is an exemplary block diagram showing the structure of a control module which is provided in a storage device in the information processing apparatus according to the embodiment.

Next, referring to FIG. 2, the structure and operation of the control module 202 are described.

The control module 202 includes a cache control module 300 and a power management control module 301. The cache control module 300 determines whether data, which is designated by a media access command (e.g. data read command, data write command) from the host device 11, is stored in the nonvolatile memory (NV cache) 204. In accordance with a result of the determination, the cache control module 300 selectively accesses one of the nonvolatile memory (NV cache) 204 and the hard disk 206.

In the case where the data, which corresponds to the LBA included in the media access command, is present in the nonvolatile memory (NV cache) 204 ("cache hit"), the cache control module 300 executes access (read access or write access) to the nonvolatile memory (NV cache) 204, and does not execute access to the hard disk 206.

On the other hand, in the case where the data, which corresponds to the LBA included in the media access command, is not present in the nonvolatile memory (NV cache) 204 ("cache miss"), the cache control module 300 executes access to the hard disk 206. If the media access command is a read command, data is read from the hard disk 206. The read data is stored in the nonvolatile memory (NV cache) 204 and is delivered to the host device 11.

In addition, the cache control module 300 executes a process of storing a predetermined set of data, which is stored in the hard disk 206, into the nonvolatile memory (NV cache) 204 as pinned data. For example, cache control module 300 can store, for instance, a set of data belonging to a specific LBA range, a set of data with high frequency of use, or a set of data that is read from the hard disk 206 during boot, into the nonvolatile memory (NV cache) 204 as pinned data.

The power management control module 301 executes a power management process for reducing the power consumption of the storage device 12. On the basis of the condition of access to the storage device 12, the power management control module 301 executes a process of stopping the rotation of the hard disk (disk storage medium) 206 and a process of starting the rotation of the hard disk (disk storage medium) 206. Specifically, the power management control module 301 sends to the HOC 205 a control signal which turns on/off the spindle motor (SPM) 207 that rotates the hard disk 206. On the basis of the received control signal, the HOC 205 turns on/off the SPM 207.

The power management control module 301 is composed of a standby control module 311, a standby timer 312 and a control register 313. The standby control module 311 executes a process of starting (or restarting) the standby timer 312, and a process of turning off the SPM 207 in response to a time-out signal from the standby timer 312. One of a reception time point (first mode) of the last media access command from the host device 11 and a reception time point (second mode) of a media access command coming from the host device 11 to cause access to the hard disk 206 is selectively usable as the starting point for starting the standby timer 312. The host device 11 can designate which of the first mode and the second mode is to be used. Information which designates the mode is set in the control register 313.

The media access command to cause access to the hard disk 206 means a media access command which designates data that is not stored in the nonvolatile memory 204. In the description below, the media access command to cause access to the hard disk 206 is referred to as "hard disk access command".

In the case of using the first mode, the standby control module 311 starts the standby timer 312 at a time point when a media access command is received, regardless of whether the media access command from the host 11 is the hard disk access command or not. If no media access command is received during the standby time from the start of the standby timer 312, the standby timer 312 generates a time-out signal which is indicative of time-out. Responding to the time-out signal, the power management control module 301 executes the process of stopping the rotation of the hard disk 206. If a media access command is received during the standby time, the standby control module 311 resets the count value of the standby timer 312, and restarts the count operation of the standby timer 312.

As has been described above, the first mode is a spin-down control mode which stops the rotation of the hard disk 206 on condition that no media access command is received during a predetermined standby time from the last reception of the media access command.

In the case of using the second mode, the standby control module 311 cooperates with the cache control module 300 and determines whether a media access command from the host device 11 is a hard disk access command or not. If the data, which is designated by the media access command from the host device 11, is not stored in the nonvolatile memory 204, the media access command is determined to be the hard disk access command. The standby control module 311 starts the standby timer 312 at a time point when the hard disk access command from the host device 11 has been received, that is, at a time point when the media access command from the host device 11 has been determined to be the hard disk access command. If a media access command (hard disk access command) to cause access to the hard disk 206 is not received during the standby time from the start of the standby timer 312, the standby timer 312 generates the time-out signal which is indicative of time-out. Responding to the time-out signal, the power management control module 301 executes the process of stopping the rotation of the hard disk 206. If the media access command (hard disk access command) to cause access to the hard disk 206 is received during the standby time, the standby control module 311 resets the count value of the standby timer 312, and restarts the count operation of the standby timer 312. If the received media access command is not the hard disk access command, the standby timer 312 is neither started nor restarted.

As has been described above, the second mode is a spin-down control mode which stops the rotation of the hard disk 206 on condition that a media access command to cause access to the hard disk 206 is not received during a predetermined standby time from the last reception of a media access command to cause access to the hard disk 206.

Furthermore, one of the reception of a media access command in the state in which the rotation of the hard disk 206 is stopped (third mode) and the reception of a hard disk access command in the state in which the rotation of the hard disk 206 is stopped (fourth mode) is selectively usable as a trigger for restarting the rotation of the hard disk 206. The host device 11 can designate which of the third mode and the fourth mode is to be used. Information which designates the mode is set in the control register 313.

In the case of using the third mode, the standby control module 311 turns on the SPM 207 and starts the rotation of the hard disk 206 at a time point when a media access command is received in the state in which the rotation of the hard disk 206 is stopped, regardless of whether the media access command from the host device 11 is the hard disk access command or not.

In the case of using the fourth mode, when a media access command has been received in the state in which the rotation of the hard disk 206 is stopped, the standby control module 311 cooperates with the cache control module 300 and determines whether this media access command is a hard disk access command or not. The standby control module 311 turns on the SPM 207 and starts the rotation of the hard disk 206 at a time point when the hard disk access command from the host device 11 has been received, that is, at a time point when the media access command from the host device 11 has been determined to be the hard disk access command.

Figure 3:
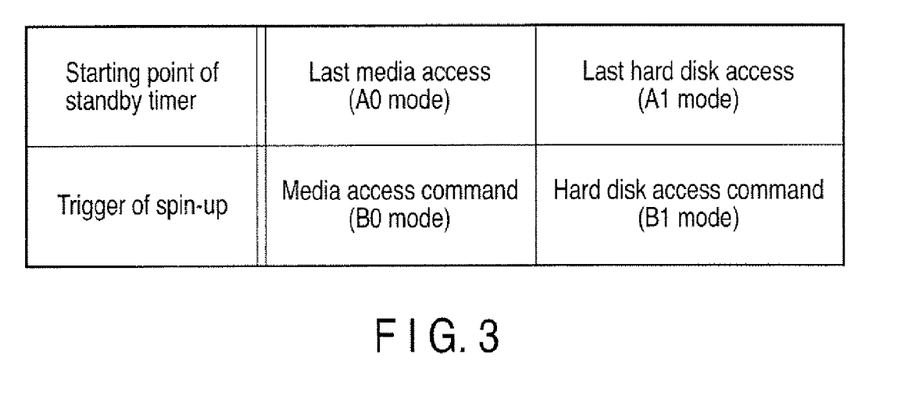
FIG. 3 is an exemplary view for explaining two modes relating to a starting point of a standby timer and two modes relating to a spin-up trigger of a disk storage medium, these modes being provided in the control module shown in FIG. 2.

FIG. 3 shows modes which are usable for the starting point of the standby timer 312 and for the trigger of spin-up.

The last media access (A0 mode) or the last hard disc access (A1 mode) is usable as the starting point of the standby timer 312. The A0 mode is the above-described first mode, and the A1 mode is the above-described second mode.

The media access command (B0 mode) or the hard disc access command (B1 mode) is usable as the trigger of spin-up. The B0 mode is the above-described third mode, and the B1 mode is the above-described fourth mode.

The host device 11 can designate an arbitrary one of four combinations of the two modes (A0 mode and A1 mode) relating to the starting point of the standby timer 312 and the two modes (B0 mode and B1 mode) relating to the trigger of spin-up. It is not always necessary for the host device 11 to explicitly designate the combination of modes, which is to be used. The host device 11 may simply designate, to the storage device 12, only a power management level which is indicative of the degree of power-saving of the storage device 12. In the case where the power management level is a reference level or more, the standby control module 311 selects the combination of the A0 mode and B0 mode, and executes the process of stopping/restarting the rotation of the SPM 207 by using the combination of the A0 mode and B0 mode. On the other hand, in the case where the power management level is lower than the reference level, the standby control module 311 selects the combination of the A1 mode and B1 mode, and executes the process of stopping/restarting the rotation of the SPM 207 by using the combination of the A1 mode and B1 mode.

A description is given of an example in which the function of the standby control module 311 is realized as the Advanced Power Management (APM) feature set in the ATA standard.

(1) As described above, the A0 mode is the mode in which the last access to the media (nonvolatile memory or hard disk) is the starting point of the standby timer, and the A1 mode is the mode in which the last hard disk access is the starting point of the standby timer.

(2) In addition, as described above, the B0 mode is the mode in which the spindle motor is turned on in response to the reception of the media access command in the standby (motor-off) state, and the B1 mode is the mode in which the spindle motor is turned on in response to the reception of the hard disk access command in the standby (motor-off) state.

(3) When APM is "disable", or when APM is "enable" and the APM level (power management level), which is designated by the host device 11, is 80h-FEh, the standby control module 311 operates in the (A0, B0) mode. The (A0, B0) mode is a performance priority mode. By using the (A0, B0) mode, the responsivity of the storage device 12 can be enhanced.

(4) When APM is "enable" and the APM level (power management level), which is designated by the host device 11, is 01h-7Fh, the standby control module 311 operates in the (A1, B1) mode. The (A1, B1) mode is a power-saving priority mode. By using the (A1, B1) mode, the power consumption of the storage device 12 can be made less than in the case of using the (A0, B0) mode.

The use of the (A1, B0) mode is also preferable. In the (A1, B0) mode, compared to the (A1, B1) mode, the spin-up is executed earlier. A length of time is needed from the start of spin-up until the hard disk 206 begins to rotate at a normal rotational speed. In the (A1, B0) mode, the starting point of the standby timer is the time point of reception of the hard disk access command, but the trigger of spin-up is the reception of the media access command. Therefore, with the use of the (A1, B0) mode, the responsivity can be made higher than in the (A1, B1) mode, and the power consumption can be made less than in the (A0, B0) mode.

In the meantime, all the four combinations can selectively be used as described below.

(5) When APM is "disable", or when APM is "enable" and the APM level, which is designated by the host device 11, is 80h-FEh, the standby control module 311 operates in the (A0, B0) mode.

(6) When APM is "enable" and the APM level, which is designated by the host device 11, is 60h-7Fh, the standby control module 311 operates in the (A0, B1) mode.

(7) When APM is "enable" and the APM level, which is designated by the host device 11, is 40h-5Fh, the standby control module 311 operates in the (A1, B0) mode.

(8) When APM is "enable" and the APM level, which is designated by the host device 11, is 01h-3Fh, the standby control module 311 operates in the (A1, B1) mode.

As has been described above, in the present embodiment, the control relating to the rotation stop and rotation start of the disk storage medium can finely be executed. Therefore, it is possible to satisfy the demands of both the user who places priority on the performance by maximizing the power consumption (by the sacrifice of the power consumption), and the user who desires to minimize the power consumption (maximize the battery driving time) by the sacrifice of the performance.

Figure 4:
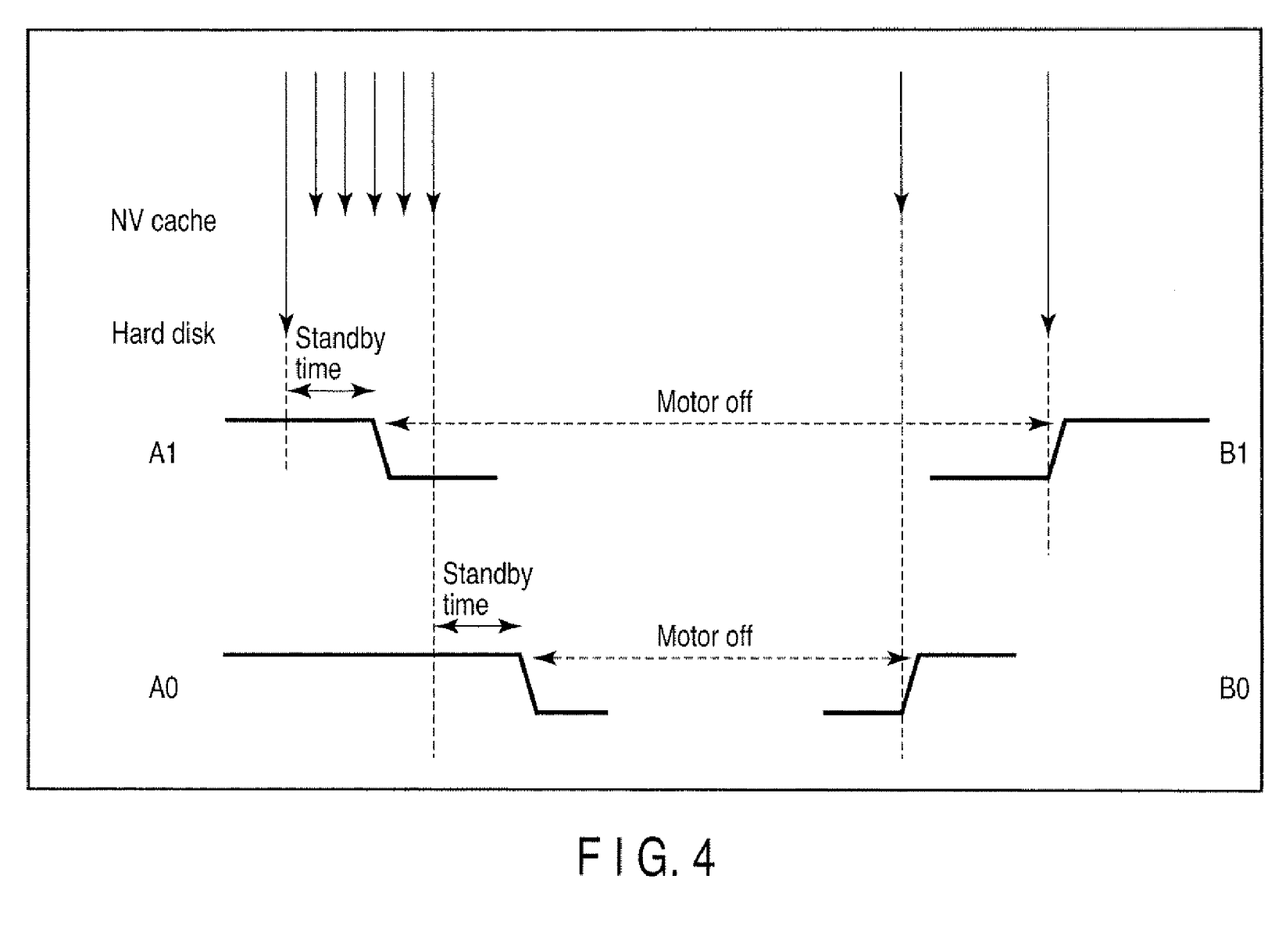
FIG. 4 is an exemplary view for explaining a standby control process which is executed by the control module shown in FIG. 2.

FIG. 4 is a view illustrating the ON/OFF control of the spindle motor 207 of the hard disk 206 in cases where the above-described modes are set.

Vertical arrows shown in an upper part of FIG. 4 indicate that data read/write is executed in the NV cache (nonvolatile memory) 204 or hard disk 206 in accordance with the media access command from the host device 11. Since the NV cache (nonvolatile memory) 204 can store pinned data, the probability of cache hit is relatively high. In FIG. 4, it is assumed that the probability that the access to the NV cache (nonvolatile memory) 204 is executed is about 80% to 90%, and the probability that the access to the hard disk 206 is executed is about 20% to 10%.

In the case where the A0 mode in which the last media access is the starting point of the standby timer 312 is selected, the standby control module 311 sets the reception time point of the last media access command from the host device 11 to be the starting point of the standby timer 312. The standby control module 312 monitors the elapsed time from the last reception of the media access command from the host device 11. If no media access command has been received during the standby time since the last reception of the media access command, the standby control module 312 sends to the HDC 205 a control signal which turns off the spindle motor 207.

In the case where the A1 mode in which the last hard disk access is the starting point of the standby timer 312 is selected, the standby control module 311 sets the time point of the last access to the hard disk 206, i.e. the reception time point of the last hard disk access command from the host device 11, to be the starting point of the standby timer 312. The standby control module 312 monitors the elapsed time from the last reception of the hard disk access command from the host device 11. If no hard disk access command has been received during the standby time since the last reception of the hard disk access command, the standby control module 312 sends to the HDC 205 a control signal which turns off the spindle motor 207.

In the case where the B0 mode in which the media access command is the trigger of spin-up is selected, if a media access command is received during the time in which the spindle motor 207 is turned off, the standby control module 311 sends to the HDC 205 a control signal which turns on the spindle motor 207.

In the case where the B1 mode in which the hard disk access command is the trigger of spin-up is selected, if a hard disk access command is received during the time in which the spindle motor 207 is turned off, the standby control module 311 sends to the HDC 205 a control signal which turns on the spindle motor 207.

Figure 5:
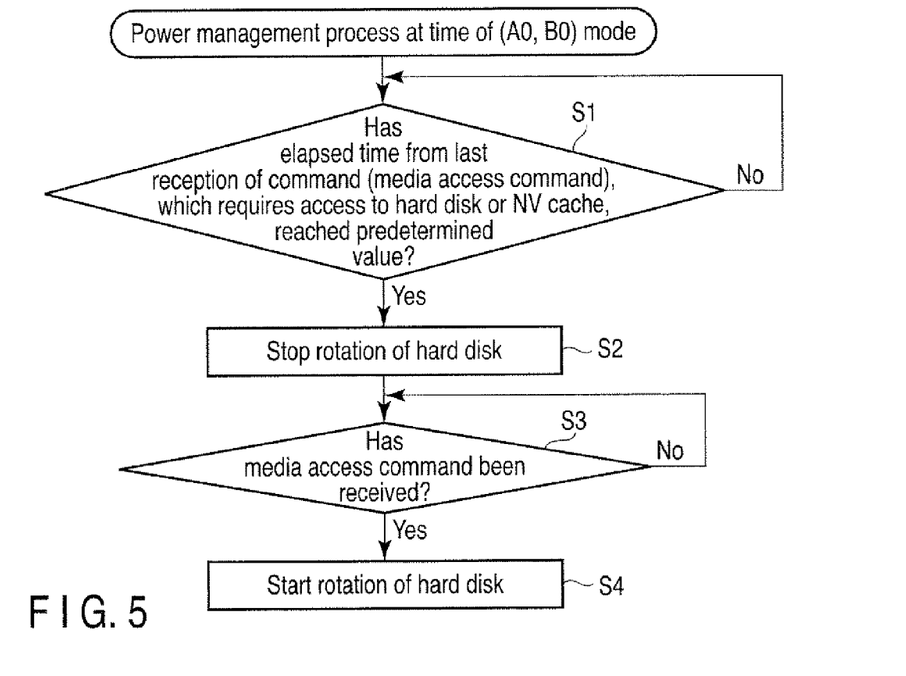
FIG. 5 is an exemplary flow chart illustrating the procedure of the standby control process at a time of a performance priority mode (A0, B0), which is executed by the control module shown in FIG. 2.

Next, referring to a flow chart of FIG. 5, a description is given of the procedure of the power management process in the case where the (A0, B0) mode is selected in accordance with a request from the host device 11.

To start with, the power management control module 301 determines whether the elapsed time from the last reception of the media access command (a command which requires access to the hard disk 206 or NV cache 204, for instance, a data read command or a data write command) has reached a predetermined value (standby time) (block S1).

In the case where the elapsed time from the last reception of the media access command has reached the predetermined value, that is, in the case where no media access command has been received during the standby time since the last reception of the media access command (YES in block S1), the power management control module 301 sends to the HOC 205 a control signal for stopping the rotation of the hard disk 206 (block S2). Responding to the received control signal, the HDC 205 turns off the spindle motor 207 and stops the rotation of the hard disk 206.

In the state in which the rotation of the hard disk 206 is stopped, the power management control module 301 determines whether a media access command has newly been received (block S3). If the media access command has newly been received (YES in block S3), the power management control module 301 sends to the HDC 205 a control signal for starting the rotation of the hard disk 206 (block S4). Responding to the received control signal, the HDC 205 turns on the spindle motor 207 and starts the rotation of the hard disk 206.

Figure 6:
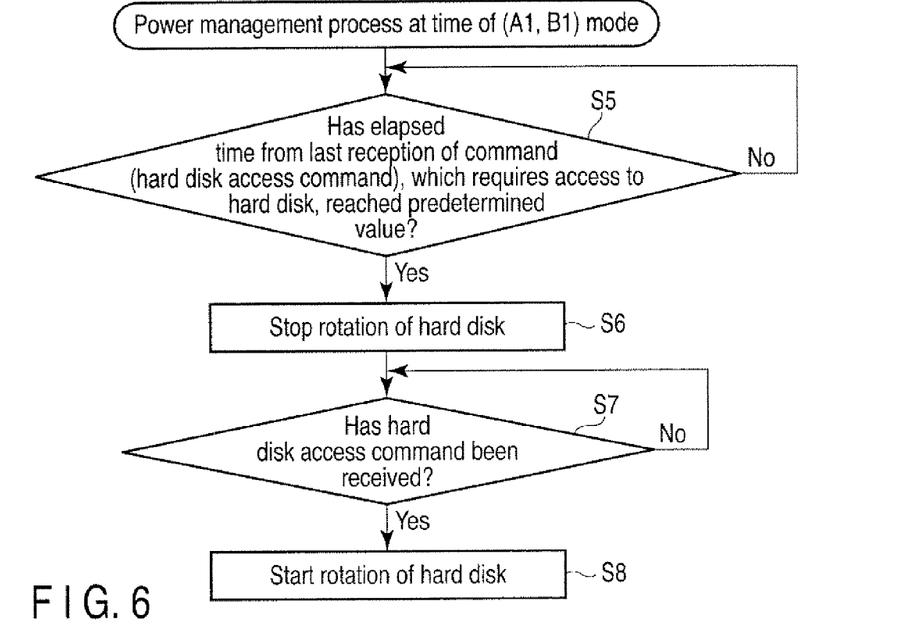
FIG. 6 is an exemplary flow chart illustrating the procedure of the standby control process at a time of a power-saving priority mode (A1, B1), which is executed by the control module shown in FIG. 2.

FIG. 6 is a flow chart illustrating the procedure of the power management process in the case where the (A1, B1) mode is selected in accordance with a request from the host device 11.

To start with, the power management control module 301 determines whether the elapsed time from the last reception of the media access command (hard disk access command), which requires access to the hard disk 206, has reached a predetermined value (standby time) (block S5).

In the case where the elapsed time from the last reception of the hard disk access command has reached the predetermined value (YES in block S5), that is, in the case where no hard disk access command has been received during the standby time since the last reception of the hard disk access command, the power management control module 301 sends to the HDC 205 a control signal for stopping the rotation of the hard disk 206 (block 36). Responding to the received control signal, the HDC 205 turns off the spindle motor 207 and stops the rotation of the hard disk 206.

In the state in which the rotation of the hard disk 206 is stopped, the power management control module 301 determines whether a hard disk access command has newly been received (block S7).

If the hard disk access command has newly been received (YES in block S7), the power management control module 301 sends to the HDC 205 a control signal for starting the rotation of the hard disk 206 (block S8). Responding to the received control signal, the HDC 205 turns on the spindle motor 207 and starts the rotation of the hard disk 206.

Figure 7:
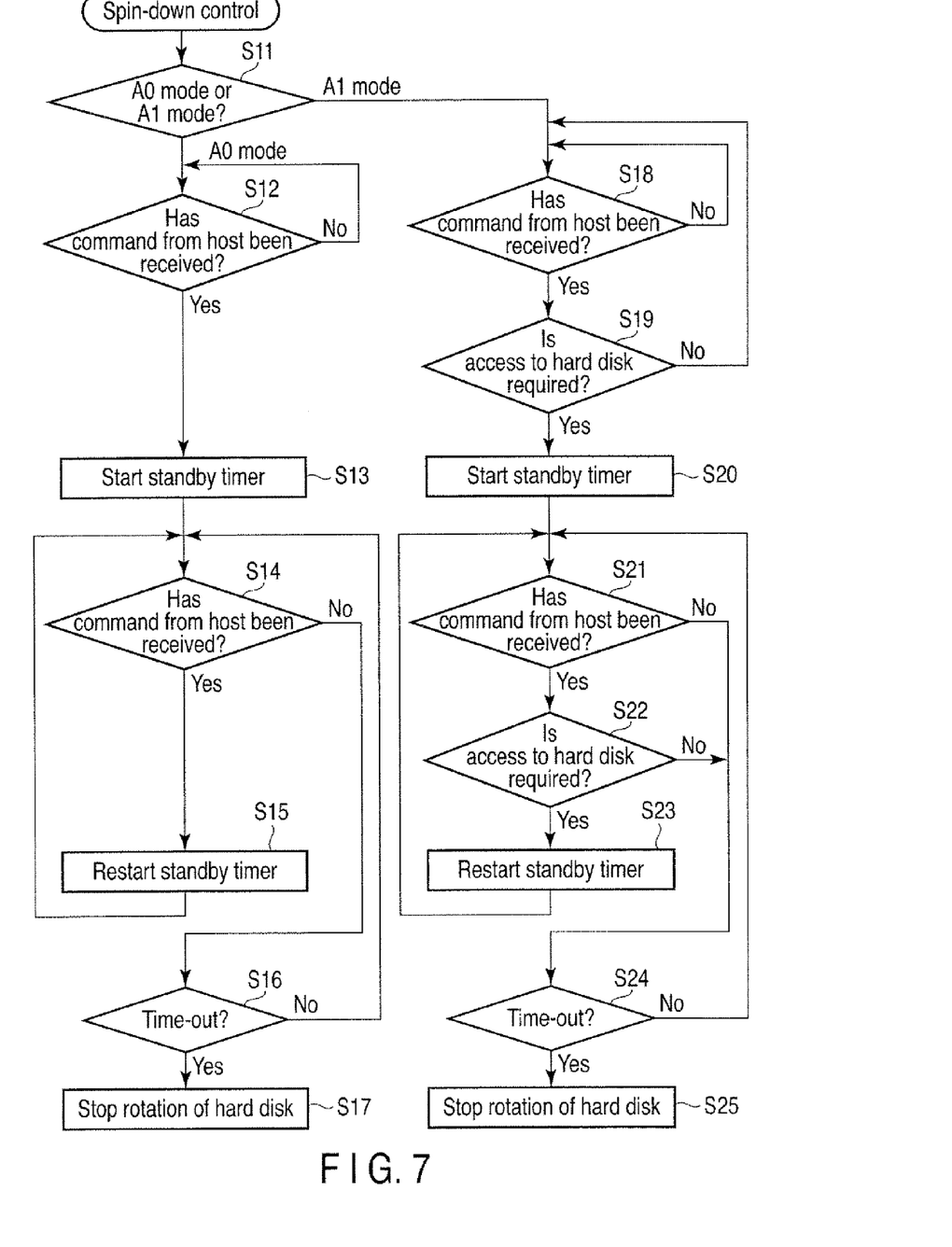
FIG. 7 is an exemplary flow chart illustrating the procedure of a spin-down control process which is executed by the control module shown in FIG. 2.

Next, referring to a flow chart of FIG. 7, the procedure of the spin-down control process is concretely described.

To begin with, the power management control module 301 determines whether the starting point of the standby timer 312 is set in the A0 mode or the A1 mode (block S11).

If the starting point of the standby timer 312 is set in the A0 mode (A0 mode in block S11), the power management control module 301 determines whether a media access command from the host device 11 has been received (block S12). If the command from the host device 11 has been received (YES in block S12), the power management control module 301 starts the standby timer 312 (block S13).

Then, the power management control module 301 determines whether a media access command from the host device 11 has newly been received (block S14). If the command from the host device 11 has newly been received (YES in block S14), the power management control module 301 resets the count value of the standby timer 312, and restarts the standby timer 312 (block S15).

In the case where no command from the host device 11 has newly been received (NO in block S14), the power management control module 301 determines whether the time (count value), which is indicated by the standby timer 312, is the time corresponding to time-out (block S16). Specifically, the power management control module 301 determines whether the elapsed time from the time point, which is set to be the starting point of the standby timer 312, to the preset time indicated by the standby timer 312 is a predetermined value or more, which is specified as a time-out value.

If the time indicated by the standby timer 312 is the time corresponding to the time-out (YES in block S16), the power management control module 301 stops the rotation of the hard disk 206 (block S17).

If the starting point of the standby timer 312 is set in the A1 mode (A1 mode in block S11), the power management control module 301 determines whether a media access command from the host device 11 has been received (block S18). If the command from the host device 11 has been received (YES in block S18), the power management control module 301 determines whether the received command is a command (hard disk access command) which requires access to the hard disk 206 (block S19). In block S19, the power management control module 301 determines whether the data, which corresponds to the LEA of the received media access command, is stored in the nonvolatile memory 204 or not. In the case where the data, which corresponds to the LBA of the received media access command, is not stored in the nonvolatile memory 204, the power management control module 301 determines that the received media access command is the hard disk access command.

In the case where the received media access command is the hard disk access command (YES in block S19), the power management control module 301 starts the standby timer 312 (block S20).

Then, the power management control module 301 determines whether a media access command from the host device 11 has newly been received (block S21). If the command from the host device 11 has newly been received (YES in block S21), the power management control module 301 determines whether the received command is a command (hard disk access command) which requires access to the hard disk 206 (block S22).

If the received media access command is the hard disk access command (YES in block 522), the power management control module 301 resets the count value of the standby timer 312, and restarts the standby timer 312 (block 323).

In the case where no media access command from the host device 11 has newly been received (NO in block S21) or in the case where a received media access command is not the hard disk access command (NO in block S22), the power management control module 301 determines whether the time (count value), which is indicated by the standby timer 312, is the time corresponding to time-out (block S24). Specifically, the power management control module 301 determines whether the elapsed time from the time point, which is set to be the starting point of the standby timer 312, to the preset time indicated by the standby timer 312 is a predetermined value or more, which is specified as a time-out value.

If the time indicated by the standby timer 312 is the time corresponding to the time-out (YES in block S24), the power management control module 301 stops the rotation of the hard disk 206 (block S25).

Figure 8:
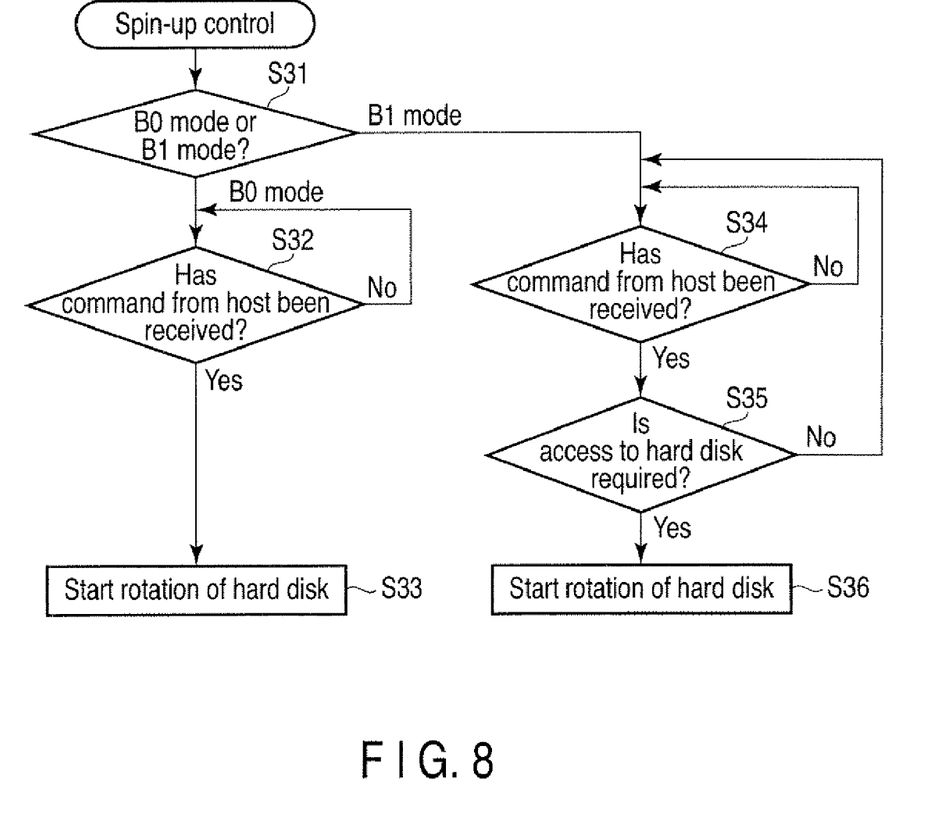
FIG. 8 is an exemplary flow chart illustrating the procedure of a spin-up control process which is executed by the control module shown in FIG. 2.

FIG. 8 is a flow chart illustrating the procedure of the spin-up control.

To start with, the power management control module 301 determines whether the trigger of spin-up is set in the B0 mode or in the B1 mode (block S31).

In the case where the trigger of spin-up is set in the B0 mode (B0 mode in block S31), the power management control module 301 determines whether a media access command from the host device 11 has been received (block S32). If a media access command from the host device 11 has been received (YES in block S32), the power management control module 301 starts the rotation of the hard disk 206 (block S33).

In the case where the trigger of spin-up is set in the B1 mode (B1 mode in block S31), the power management control module 301 determines whether a media access command from the host device 11 has been received (block S34). If a media access command from the host device 11 has been received (YES in block S34), the power management control module 301 determines whether the received media access command is a command (hard disk access command) which requires access to the hard disk 206 (block S35).

If the received media access command is the command (hard disk access command) which requires access to the hard disk 206 (YES in block S35), the power management control module 301 starts the rotation of the hard disk 206 (block S36).

Figure 9:
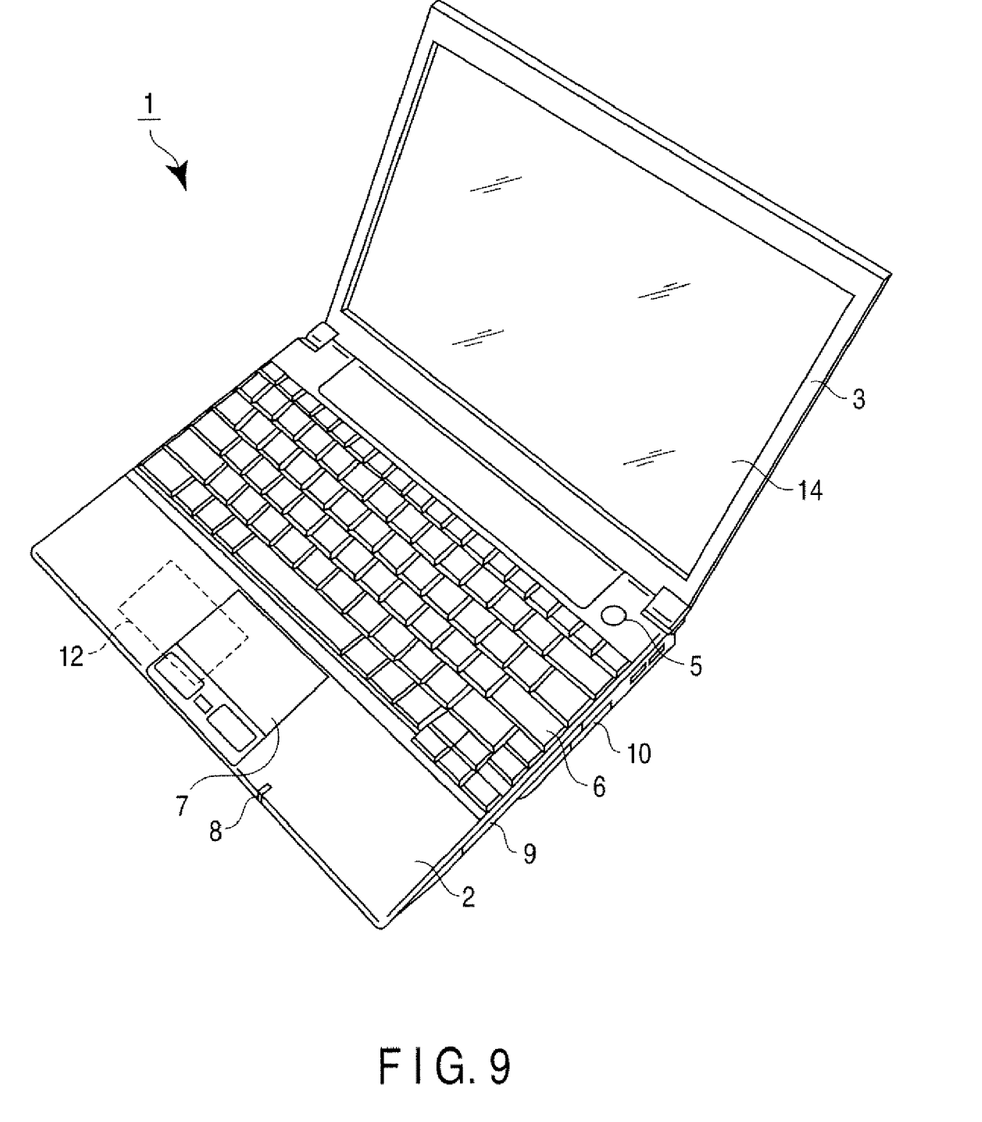
FIG. 9 is an exemplary perspective view showing the external appearance of an information processing apparatus according to the embodiment.

Next, reference to FIG. 9, a description is given of a structure example of the information processing apparatus 1 which incorporates the storage device (hybrid HDD) 12.

The information processing apparatus 1 may be realized, for example, as a notebook-type portable computer. FIG. 9 is a perspective view showing the external appearance of the information processing apparatus 1 which is realized as a portable computer.

The information processing apparatus 1 comprises an information processing apparatus main body 2 and a display unit 3. A display device that is composed of an LCD (Liquid Crystal Display) 4 is built in the display unit 3.

The display unit 3 is attached to the information processing apparatus main body 2 such that the display unit 3 is freely rotatable between an open position where the top surface of the main body 2 is exposed and a closed position where the top surface of the main body 2 is covered. The main body 2 has a thin box-shaped housing. A power switch 5, a keyboard 6 and a touch pad 7 are disposed on the top surface of the housing.

An LED (Light Emitting Diode) 8 is disposed on the front surface of the main body 2. An optical disc drive (ODD) 9 which can write and read data on an optical disc medium such as a DVD (Digital Versatile Disc), and a PC card slot 10, which detachably accommodates a PC card, are disposed on the right side surface of the main body 2. In the information processing apparatus 1, the storage device 12 of the present embodiment is accommodated in the main body 2 as an external storage device functioning as a boot drive. The information processing apparatus main body 2 functions as the above-described host device 11.

Figure 10:
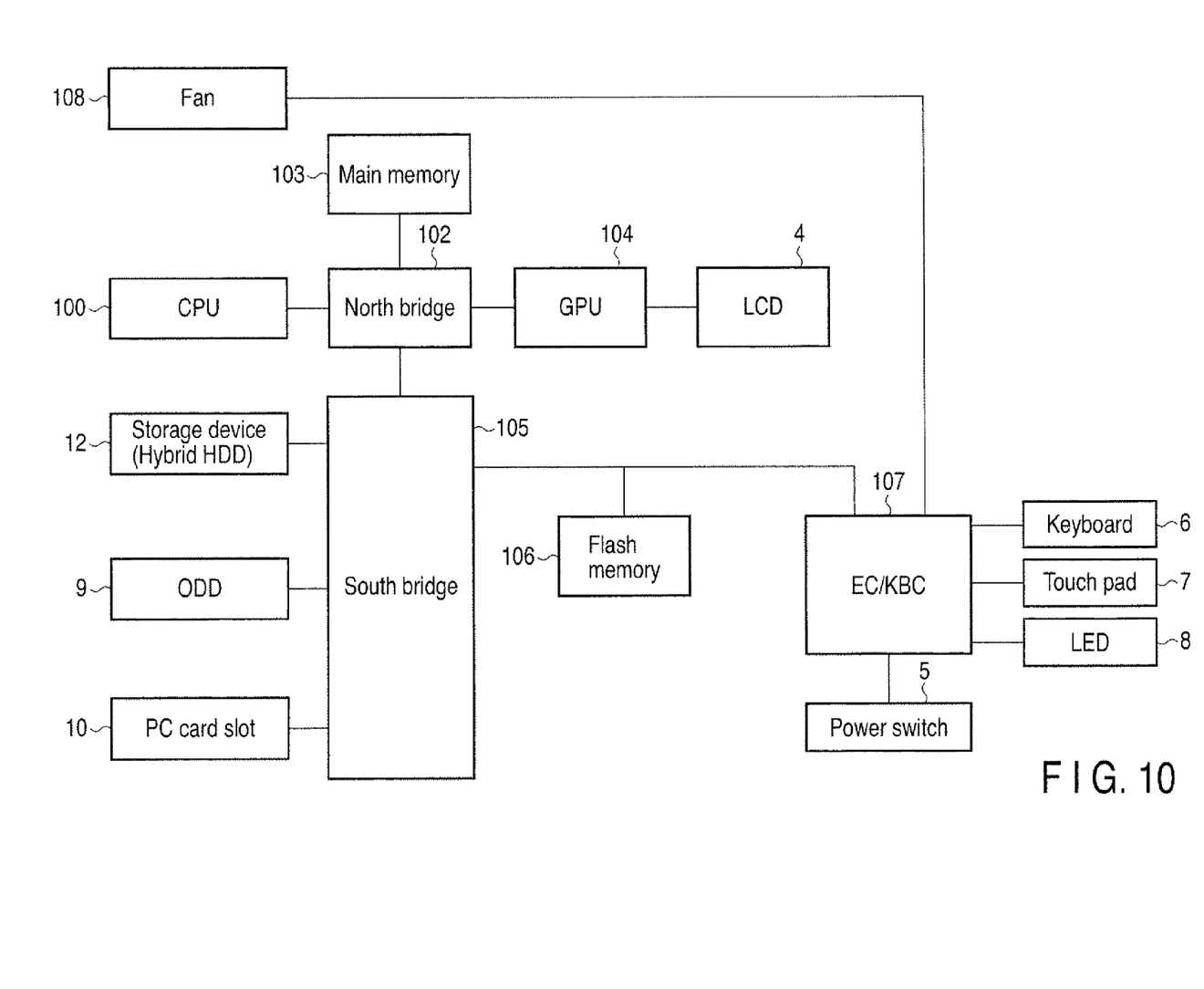
FIG. 10 is an exemplary block diagram showing the system configuration of the information processing apparatus according to the embodiment.

FIG. 10 is a block diagram showing the system configuration of the information processing apparatus 1 shown in FIG. 9.

The information processing apparatus 1, as shown in FIG. 10, includes a CPU 100, a north bridge 102, a main memory 103, a GPU (Graphic Processing Unit) 104, a south bridge 105, a flash memory 106, an EC/KBC (Embedded Controller/Keyboard Controller IC) 107 and a fan 108, in addition to the above-described LCD 4, power switch 5, keyboard 6, touch pad 7, LED 8, ODD 9, PC card slot 10 and storage device 12.

The CPU 100 is a processor which controls the operation of the respective components of the information processing apparatus 1. The CPU 100 executes an operating system and various application programs including utilities, which are loaded from the storage device 12 into the main memory 103. In addition, the CPU 111 executes a BIOS (Basic Input/Output System) that is stored in the flash memory 106. The BIOS is a program for hardware control. The BIOS executes, for example, a process of enabling/disabling the APM function of the storage device 12, and a process of setting the APM level of the storage device 12. Instead of setting the APM level for the storage device 12, the BIOS may send to the storage device 12 a request which designates a spin-down control mode (A0 mode or A1 mode) that is to be used and a spin-up control mode (B0 mode or B1 mode) that is to be used.

The north bridge 102 is a bridge device which connects a local bus of the CPU 100 and the south bridge 105. The north bridge 102 has a function of executing communication with the GPU 104 via a bus. In addition, the north bridge 102 includes a memory controller which access-controls the main memory 103. The GPU 104 controls the LCD 4 which is used as a display device of the information processing apparatus 1.

The south bridge 105 is a controller which controls various devices such as the storage device 12, the ODD 9, the PC card loaded in the PC card slot 10, and the flash memory 106.

The EC/KBC 107 is a 1-chip microcomputer in which an embedded controller for power management and a keyboard controller for controlling the keyboard 6 and touch pad 7 are integrated. The EC/KBC 107 also executes control of the LED 8 and the fan 108 for cooling.

In the Advanced Power Management (APM) feature set of the ATA standard, the performance and power consumption of a device are determined by a value which is designated by the APM level. Specifically, as the APM level is higher, the performance of the device becomes higher. In addition, as the APM level is higher, the power consumption of the device becomes higher.

The BIOS determines, for example, whether the information processing apparatus 1 is driven by a battery or an external power supply (AC power supply). In the case where the information processing apparatus 1 is driven by the battery, the BIOS sets a relatively low APM level for the storage device 12. In this case, the storage device 12 selects, for example, the (A1, B1) mode, and controls turn-on/off of the spindle motor 207 by using the (A1, B1) mode. On the other hand, in the case where the information processing apparatus 1 is driven by the external power supply, the BIOS sets a relatively high APM level for the storage device 12. In this case, the storage device 12 selects, for example, the (A0, B0) mode, and controls turn-on/off of the spindle motor 207 by using the (A0, B0) mode.

As has been described above, in the present embodiment, the storage device 12 has two modes (A0 mode and A1 mode) for spin-down control and two modes (B0 mode and B1 mode) for spin-up control. Using the spin-down control mode and spin-up control mode which are selected in accordance with a request from the host device 11, the storage device 12 can control turn-on/off of the spindle motor 207. Therefore, the ON/OFF timing of the spindle motor 207 can finely be controlled, with consideration being given even to the cache hit/cache miss.

In the present embodiment, the description has been given only to the case in which the nonvolatile memory is used as the cache memory. However, it is possible to adopt such a structure that a volatile memory is used as the cache memory of the hard disk 206.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit the inventions.

What is claimed is:

1. A storage device comprising:
a disk storage medium;
a cache memory configured to store data read from the disk storage medium;
a cache control module configured to determine whether data, which is designated by a media access command from a host device, is stored in the cache memory, and to selectively access the cache memory and the disk storage medium in accordance with a result of the determination; and
a power management module configured to have a first mode of stopping rotation of the disk storage medium on condition that a media access command is not received during a predetermined time from last reception of a media access command, and a second mode of stopping the rotation of the disk storage medium on condition that a media access command which causes access to the disk storage medium is not received during a predetermined time from last reception of a media access command which causes access to the disk storage medium, to execute a process of stopping the rotation of the disk storage medium by using one of the first mode and the second mode, which is selected in accordance with a request from the host device, to have a third mode of starting the rotation of the disk storage medium on condition that a media access command is received in a state in which the rotation of the disk storage medium is stopped, and a fourth mode of starting the rotation of the disk storage medium on condition that a media access command which causes access to the disk storage medium is received in a state in which the rotation of the disk storage medium is stopped, and to execute a process of starting the rotation of the disk storage medium by using one of the third mode and the fourth mode, which is selected in accordance with a request from the host device.

2. The storage device of claim 1, wherein the power management module is configured to select a combination of the first mode and the third mode if a power management level indicative of a degree of power-saving of the storage device, which is designated by a request from the host device, is a reference level or more, and the power management module is configured to select a combination of the second mode and the fourth mode if the power management level is lower than the reference level.

3. The storage device of claim 1, wherein the cache memory is composed of a nonvolatile memory, and the cache control module is configured to store a predetermined set of data, which is stored in the disk storage medium, into the nonvolatile memory.

4. A storage device comprising:
  a disk storage medium;
  a cache memory configured to store data read from the disk storage medium;
  a cache control module configured to determine whether data, which is designated by a media access command from a host device, is stored in the cache memory, and to selectively access the cache memory and the disk storage medium in accordance with a result of the determination; and
  a power management module configured to select, in accordance with a request from the host device, one of a first process of stopping rotation of the disk storage medium on condition that a media access command is not received during a predetermined time from last reception of a media access command, and starting the rotation of the disk storage medium on condition that a media access command is received in a state in which the rotation of the disk storage medium is stopped, and a second process of stopping the rotation of the disk storage medium on condition that a media access command which causes access to the disk storage medium is not received during a predetermined time from last reception of a media access command which causes access to the disk storage medium, and starting the rotation of the disk storage medium on condition that a media access command which causes access to the disk storage medium is received in a state in which the rotation of the disk storage medium is stopped, and to execute the selected process.

5. The storage device of claim 4, wherein the power management module is configured to select the first process if a power management level indicative of a degree of power-saving of the storage device, which is designated by a request from the host device, is a reference level or more, and the power management module is configured to select the second process if the power management level is lower than the reference level.

6. The storage device of claim 4, wherein the cache memory is composed of a nonvolatile memory, and the cache control module is configured to store a predetermined set of data, which is stored in the disk storage medium, into the nonvolatile memory.

7. An information processing apparatus comprising:
  an information processing apparatus main body; and
  a storage device provided in the information processing apparatus main body, the storage device including a disk storage medium; a cache memory configured to store data read from the disk storage medium; a cache control module configured to determine whether data, which is designated by a media access command from the information processing apparatus main body, is stored in the cache memory, and to selectively access the cache memory and the disk storage medium in accordance with a result of the determination; and a power management module which is configured to have a first mode of stopping rotation of the disk storage medium on condition that a media access command is not received during a predetermined time from last reception of a media access command, and a second mode of stopping the rotation of the disk storage medium on condition that a media access command which causes access to the disk storage medium is not received during a predetermined time from last reception of a media access command which causes access to the disk storage medium, to execute a process of stopping the rotation of the disk storage medium by using one of the first mode and the second mode, which is selected in accordance with a request from the information processing apparatus main body, to have a third mode of starting the rotation of the disk storage medium on condition that a media access command is received in a state in which the rotation of the disk storage medium is stopped, and a fourth mode of starting the rotation of the disk storage medium on condition that a media access command which causes access to the disk storage medium is received in a state in which the rotation of the disk storage medium is stopped, and to execute a process of starting the rotation of the disk storage medium by using one of the third mode and the fourth mode, which is selected in accordance with a request from the information processing apparatus main body.

8. The information processing apparatus of claim 7, wherein the power management module is configured to select a combination of the first mode and the third mode if a power management level indicative of a degree of power-saving of the storage device, which is designated by a request from the information processing apparatus main body, is a reference level or more, and the power management module is configured to select a combination of the second mode and the fourth mode if the power management level is lower than the reference level.

9. The information processing apparatus of claim 7, wherein the cache memory is composed of a nonvolatile memory, and the cache control module is configured to store a predetermined set of data, which is stored in the disk storage medium, into the nonvolatile memory.

* * * * *